United States Patent [19]

Miller

[11] Patent Number: 4,474,403
[45] Date of Patent: Oct. 2, 1984

[54] TRAVEL TRAILER AWNING

[75] Inventor: Mahlon A. Miller, Nappanee, Ind.

[73] Assignee: Holiday Rambler Corporation, Wakarusa, Ind.

[21] Appl. No.: 277,708

[22] Filed: Jun. 26, 1981

[51] Int. Cl.³ .............................................. B60J 1/20
[52] U.S. Cl. .................................. 296/96; 296/97 A; 296/1 S; 220/331; 49/208; 16/362
[58] Field of Search ................... 296/1 S, 95 R, 95 C, 296/95 Q, 96, 97 A, 163; 160/82, 368 S; 135/1 A, 5 A, 5 AT; 49/197, 246, 248, 249, 201, 202, 208, 254, 257, 258, 260; 16/362, 363; 220/331; 117/120

[56] References Cited

U.S. PATENT DOCUMENTS

| 492,926 | 8/1983 | Lyon | 49/202 |
| 3,239,267 | 3/1966 | Reynolds | 296/96 |
| 3,425,740 | 2/1969 | De Vaughn | 280/403 |
| 4,170,378 | 10/1979 | Jacobsen | 296/95 C |

Primary Examiner—Robert B. Reeves
Assistant Examiner—Dennis H. Pedder
Attorney, Agent, or Firm—Alexander & Zalewa

[57] ABSTRACT

This invention is a recreational vehicle awning which closes to provide a streamline configuration conforming to the exterior of the vehicle and which opens to provide an essentially flat rigid awning.

12 Claims, 11 Drawing Figures

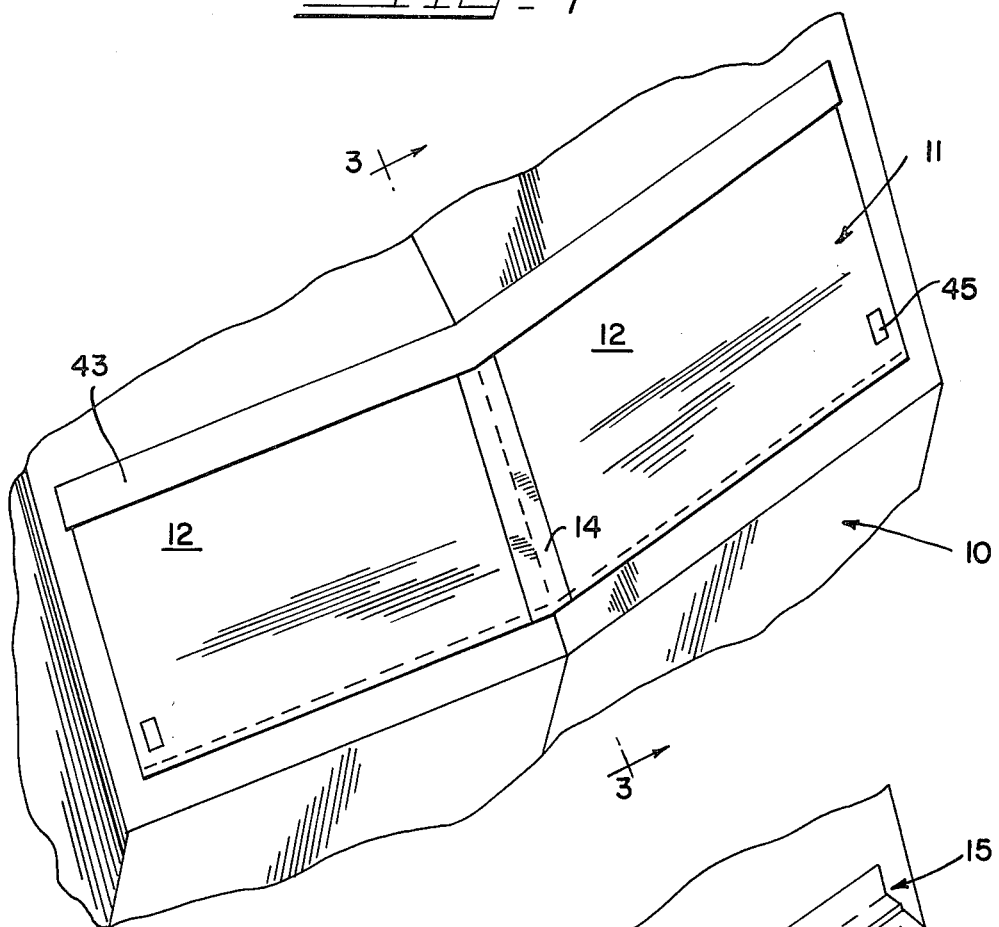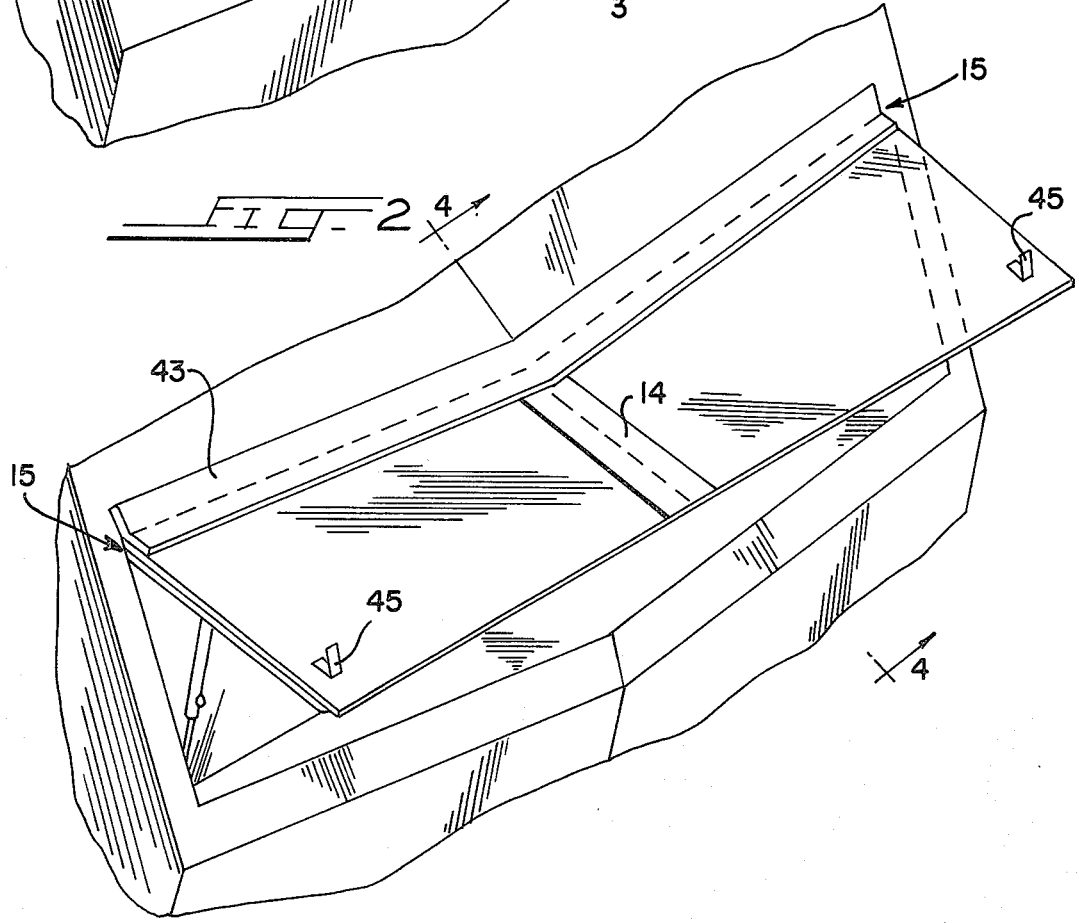

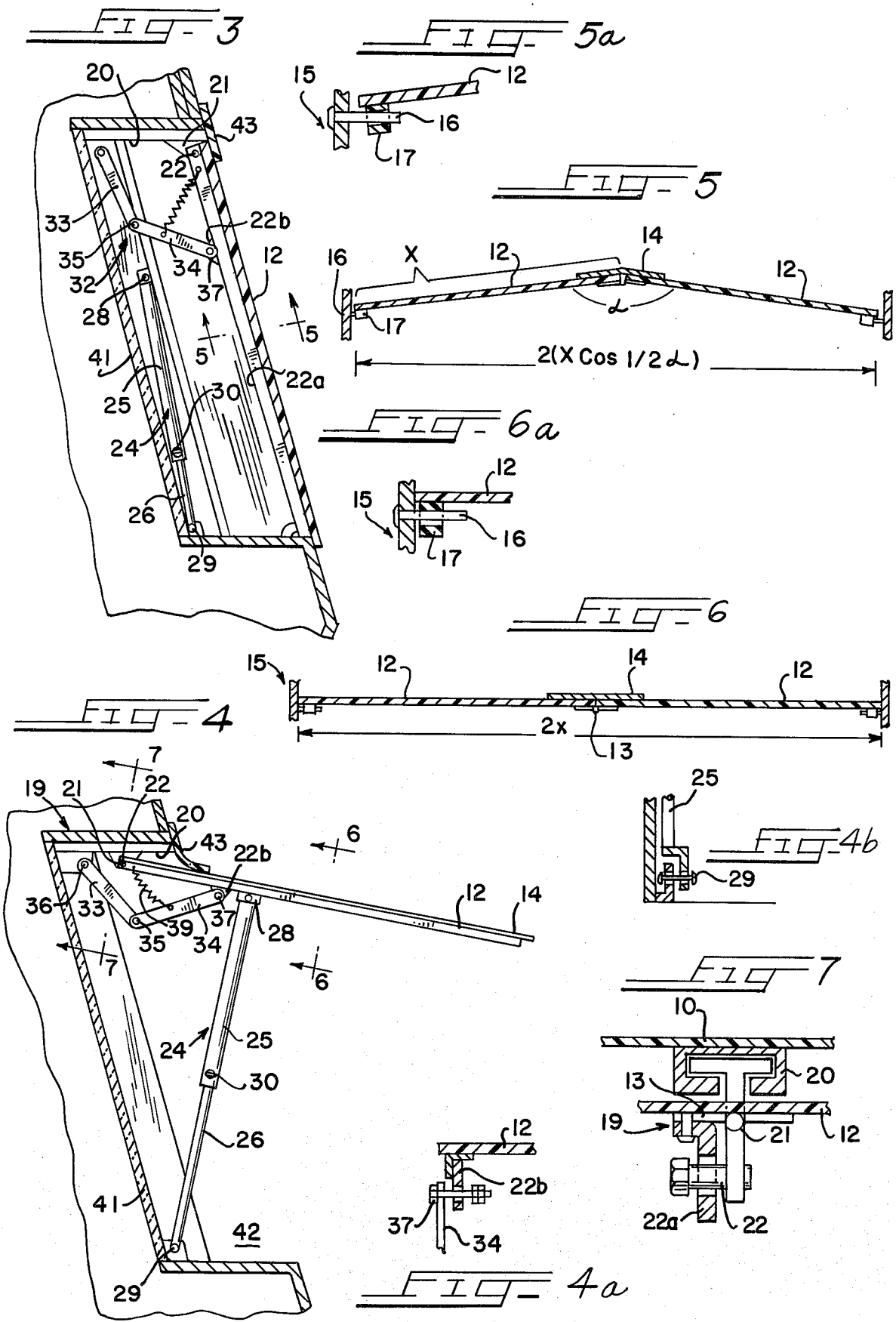

TRAVEL TRAILER AWNING

BACKGROUND OF THE INVENTION

This invention relates to an aerodynamically shaped travel awning which in its closed position fits flush against the recreational vehicle and which in its open position is planar and provides conventional awning protection against sunlight and precipitation. In the manufacture of such an awning, it becomes necessary not only to mount the awning pivotally at its lateral portions, but it is also necessary to flexibly hinge the awning along its vertical centerline and to provide additional mounting means between that centerline and the travel vehicle. This allows the awning to be flexible at the center, thereby presenting an aerodynamic shape to the exterior of the travel vehicle when closed while enabling the awning to open into an essentially planar shape.

With the onset of national concern over the conservation of petroleum based fuels, many different problems have been evaluated by those skilled in the motor vehicle art. Such problems are generally especially acute for large over-the-road vehicles which present a large cross-section to the direction of travel. While streamlining or providing a contour designed to minimize resistance to motion is conventionally known in the design of recreational motor vehicles, it has not hitherto been possible to provide a streamlined configuration for the front and rear windows of such a vehicle while also providing flush fitting planar awning protection for those windows.

Accordingly, it is an object of the present invention to provide an awning of aerodynamic shape which, in its downward closed position fits in a flush manner into the streamlined configuration containing windows at the front or rear of a travel vehicle, and which in its upward raised position provides planar awning protection for said windows, the awning being fixedly attached to the travel vehicle.

It is a further object of the present invention to provide aerodynamically streamlined protection for a sttreamlined window configuration installed at either the front or rear of a recreational motor vehicle, such protection being against rocks and other debris thrown up from the highway, and from the moisture and dirt associated with high speed over-the-road travel.

Other objects and a fuller understanding of my invention may be had by referring to the following description and claims, taken in conjunction with the accompanying drawing, in which:

FIG. 1 represents an isometric view of the aerodynamic awning in a downward closed position;

FIG. 2 represents an isometric view of the aerodynamic awning in an upward open position;

FIG. 3 is a cross-sectional view of the closed awning taken along line 3—3 of FIG. 1;

FIG. 4 is a cross-sectional view taken along the line 4—4 on FIG. 2, showing the awning in an open position;

FIG. 4a is an enlarged detail view showing the connection of the awning to a central articulated brace;

FIG. 4b is an enlarged detail view showing a typical pivotal connection of a support strut to a vehicle;

FIG. 5 is an edge-on view taken along line 5—5 on FIG. 3, showing the aerodynamic shape of the awning in its closed position;

FIG. 5a is an enlarged detail view showing the pivotal connection of the awning as shown in FIG. 5 to a connection member on a vehicle;

FIG. 6 is an edge-on view taken along line 6—6 of FIG. 4, showing the edge view of the awning in open position;

FIG. 6a is an enlarged detail view showing the pivotal connection of the awning as shown in FIG. 6 to a connection member on a vehicle; and FIG. 7 is a fragmentary view taken along line 7—7 of FIG. 4 showing the arrangement of the centerline support of the awning.

DETAILED DESCRIPTION OF THE INVENTION

With reference to the drawings, the aerodynamic awning 11 of this invention is comprised of mirror-image halves 12 hinged to each other in the vertical plane in the center of the awning by a hinge 13. A resilient dirt and moisture-proof center seal 14 is provided on the outboard side of the center vertical joint of the hinged halves 12.

The awning 11 is mounted to the travel vehicle 10 at the upper part of each unhinged side of each half awning part 12 by side mounts 15 providing for pivotal movement of the awning from a downward closed position to an upward open position along a horizontal axis substantially perpendicular to the axis of the hinge 13. In addition, side mounts 15 permit limited lateral movement of the awning as it is raised and lowered (see FIGS. 5 and 6).

In its closed position, the length of the awning 10 across the vehicle is, as indicated in FIG. 5, $2(x \cos \frac{1}{2}\alpha)$ where x is the length of each half 12 and $\alpha$ is the obtuse inside angle formed by the halves about the hinge 13. However, when the awning is opened to its raised planar position, the length increases to twice the length of each half or 2 x as indicated in FIG. 6. Accordingly, some provision must be made to accommodate the change in length by permitting limited lateral movement when the awning is pivoted from one position to the other.

In the embodiment shown in the drawings, side mounts 15 each comprise a pintle 16 on the vehicle 10 and a bushing or collar 17 on the unhinged side of the awning half. Pintle 16 is received in bushing 17 so that while the awning is being moved from one position to the other, bushing 17 pivots about pintle 16 and also slides laterally along the axis of pintle 16 to create a loose fit connection means (See FIGS. 5a and 6a).

At the upper center of the awning, the awning is further attached to the travel vehicle by a slide mechanism 19. As seen in FIGS. 1 and 2, the combination of the vertical awning hinge 13, the slide mechanism 19, and the lateral pivot points or side mounts 15, enables the shape of the awning to be changed from aerodynamically pointed and streamlined (or V-shaped) in the downward closed position to essentially flat and planar in the upward open position. As further seen in FIG. 2 and as seen in FIG. 6, when in the upward open position, the mirror-image halves 12 of the awning 11 lie esssentially in the same plane.

Slide mechanism 19 as shown in FIG. 7, comprises a slide channel 20 that is secured to or integral with the vehicle in a plane parallel to the longitudinal centerline of the travel vehicle. A T-shaped slide block 21, pivotally connected to the awning (by member 22a) at the center or hinge 13 by a loose fit connection means as indicated by reference numeral 22 in FIG. 7, is received for reciprocal movement in a plane parallel to the axis of the center hinge 13.

When the awning is in the upward open position, it can be seen from FIGS. 2 and 4 that the awning 11 is supported in that open position by slidable locking support members 24, each of which comprise a strut sleeve 25 which receives a telescoping strut insert 26. The free end of the sleeve 25 is pivotally secured to the awning bracket 28 and the free end of the insert 26 is pivotally linked to the vehicle as at 29, both by loose fit connection means. A wing screw 30 or the like may be used to lock the strut parts 25 and 26 with respect to each other in the extended telescope position. As can be seen from the cross-sectional views of FIGS. 3 and 4 in which the awning is, respectively, lowered and raised, when the awning is closed slide block 21, extending and projecting upwardly at the top portion of hinged axis 13, is at the most forward position toward the exterior of the travel vehicle in slide channel 20. As awning 11 is opened, slide block 21 slides rearward in slide channel 20 as the mirror image halves 12 of awning 11 begin to flatten into essentially the same plane, full and complete coplanarity between mirror-image halves 12 not being attained until awning 11 has been fully opened and raised. During raising and lowering and the change in awning confuguration accompanying these operations, lateral pivot mounts 15 retain the respective positions of the awning sides in relation to the travel vehicle.

In addition to slide mechanism 19, additional support is provided at the centerline of the awning by articulated brace 32 comprising arm 33 and leg 34 pivotally joined together at 35. The leg 34 is loosely pivotally attached to awning 11 at bracket 22b on member 22a near the centerline hinge 13 at a point, 37, below the top of the awning and slide block 21. Arm 33 is pivotally attached at 36 to the recreational vehicle at the centerline and adjacent slide channel 20. Brace 32 is further connected to awning 11 by tension spring 39 having one end secured to the awning and the other end to leg 34. During closing and in the closed position, tension spring 39 exerts upward and outward force on the brace 32 thereby stabilizing the streamlined configuration as an obtuse angle on the inner window-facing portion of said awning and as a reflex angle on the outer external portion of said awning in conjunction with side mounts 15.

During the translational motion parallel the longitudinal centerline of awning 11 allowed and defined by slide mechanism 19, support members 24 at the sides of awning 11 extend and swing outward as awning 11 is raised and retract and swing inward as the awning is lowered.

Advantageously, awning 11 may be flushly fitted to the aerodynamically shaped portion of a travel vehicle when the window 41, covered and protected by awning 11, is recessed from the exterior of the vehicle. Recess 42 in which window 41 is mounted allows locking telescope support members 24 and the entirety of slide mechanism 19 and brace 32 to be covered and protected from the exterior when awning 11 is in a downward closed position. Recess 42 further allows for the provision of weather stripping 43 at the top and outside of recess 42 to protect against the entry of dirt and moisture both when the awning is open and raised and when it is down and closed.

Each of the awning halves 12 is provided with a latch 45 of conventional construction. When locked, the latch 45 is flush with the awning half. In opening the awning the unlocked latches 45 provide convenient handles for lifting the awning to the position desired.

While a specific embodiment of the present invention has been shown and described, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A travel trailer awning comprising, in combination:
    two mirror image halves flexibly hinged to each other along a central vertical axis shared between said halves at substantially the vertical centerline of said awning, said axis being movable in a vertical plane during pivotally raising said awning to an open position and pivotally lowering said awning to a closed position;
    means for pivotally mounting said awning at a top portion of each of said halves at an end of each of said halves opposite said central vertical axis for enabling said awning to be pivotally raised to an open position and pivotally lowered to a closed position; and
    means for slidably mounting said awning adjacent said central vertical axis whereby said awning is substantially an aerodynamically pointed awning in said closed position and said awning is substantially a planar awning in said open position.

2. The invention defined in claim 1 in which said pivotal mounting means is comprised of a pintle received within a bushing for pivotal and lateral movement of said bushing with respect to said pintle.

3. The invention as defined in claim 2 in which said slidable mounting means is a slide block slidably engaged with a slide channel.

4. In a travel vehicle awning for a travel vehicle having an aerodynamically pointed exterior end having a recess and having a window mounted in said recess and recessed from said exterior end of said vehicle, said recess being defined by a substantially horizontal top and two sides, said recess having a substantially vertical centerline and said two sides each being disposed a substantially equal and opposite distance laterally away from said centerline on said exterior end, said awning comprising:
    two substantially mirror image halves hinged to each other substantially along said centerline of said recess and substantially covering said recess and flushly fitted to said aerodynamically pointed end in a closed position for protecting said window from debris during over-the-road travel;
    a side mount on the upper part of each side of said recess for pivotally connecting said awning to said vehicle; and
    slide mounting means for slidably engaging each an upper portion of said awning adjacent said centerline and said top of said recess adjacent said centerline for enabling said halves hinged to each other to slide into said recess along said centerline for enabling said awning to be pivotally raised to an upward open position whereby said awning is substantially planar for providing awning protection against sunlight and precipitation in said open position.

5. The invention as defined in claim 4 in which said side mount at the upper part of each side of said recess is a pintle connected to said vehicle and a bushing connected to said awning, said pintles being received in said bushings for enabling said awning to move from said aerodynamically pointed closed position to said substantially planar open position and from said open position to said closed position.

6. The invention as defined in claim 5 in which said pintle is received in said bushing whereby said bushing pivots about said pintle and moves laterally with respect to said pintle as said awning is moved from one of an open or closed position to another of an open or closed position.

7. The invention as defined in claim 4 together with a resistent weather strip seal on an outboard side of said awning covering said halves where they are hinged to each other for preventing leakage between the hinged halves.

8. The invention as defined in claim 4 in which said slide mounting means is comprised of a slide channel secured to said vehicle in a plane parallel to a longitudinal centerline of said vehicle and a slide block pivotally connected to said awning adjacent the centerline and said slide block is received in said slide channel for reciprocal movement for enabling said halves hinged to each other to slide toward and away from said window along said slide channel.

9. The invention as defined in claim 4 together with slidable locking support members pivotally secured to said awning and pivotally linked to said vehicle for locking said awning in said open position.

10. The invention as defined in claim 8 in which a hinge flexibly connects said halves to each other and said slide block is connected to said awning adjacent said hinge.

11. The invention as defined in claim 10 together with an articulated brace pivotally attached to said vehicle adjacent said slide channel and pivotally attached to said awning adjacent said hinge for stabilizing said awning with respect to said side mount.

12. The invention as defined in claim 11 together with a tension spring further connecting said awning to said articulated brace for exerting upward and outward force on said brace.

* * * * *